(12) United States Patent
Furukawa

(10) Patent No.: US 7,733,407 B2
(45) Date of Patent: Jun. 8, 2010

(54) IMAGE PROCESSING APPARATUS AND METHOD FOR PREFERABLY CORRECTING DISTORTION ABERRATION

(75) Inventor: Hideaki Furukawa, Akiruno (JP)

(73) Assignee: Olympus Corporation, Tokyo (JP)

( * ) Notice: Subject to any disclaimer, the term of this patent is extended or adjusted under 35 U.S.C. 154(b) by 840 days.

(21) Appl. No.: 11/602,238

(22) Filed: Nov. 21, 2006

(65) Prior Publication Data

US 2007/0115384 A1   May 24, 2007

(30) Foreign Application Priority Data

Nov. 24, 2005   (JP)   ............................. 2005-338406

(51) Int. Cl.
*H04N 5/225* (2006.01)
(52) U.S. Cl. ...................................... 348/335
(58) Field of Classification Search ................. 348/335; 382/275
See application file for complete search history.

(56) References Cited

U.S. PATENT DOCUMENTS

| | | | | |
|---|---|---|---|---|
| 6,097,430 A * | 8/2000 | Komiya et al. | ........... | 348/218.1 |
| 6,747,757 B1 * | 6/2004 | Enomoto | .................... | 358/1.9 |
| 7,227,574 B2 * | 6/2007 | Yamanaka | .................. | 348/242 |
| 7,304,680 B2 * | 12/2007 | Kohler et al. | ................ | 348/335 |
| 7,339,699 B1 * | 3/2008 | Suzuki et al. | ................. | 358/1.9 |
| 7,460,728 B2 * | 12/2008 | Kawanishi et al. | ........... | 382/274 |
| 7,505,680 B2 * | 3/2009 | Niwa | ........................... | 396/155 |
| 2004/0174445 A1 * | 9/2004 | Kawakami et al. | ........... | 348/251 |
| 2006/0188172 A1 * | 8/2006 | Higurashi et al. | ............ | 382/275 |
| 2007/0025636 A1 * | 2/2007 | Furukawa et al. | ............ | 382/275 |

FOREIGN PATENT DOCUMENTS

| | | |
|---|---|---|
| JP | 2000-3437 A | 1/2000 |
| JP | 2000-156785 A | 6/2000 |
| JP | 2004-272578 A | 9/2004 |

* cited by examiner

*Primary Examiner*—Jason Chan
*Assistant Examiner*—Gary C Vieaux
(74) *Attorney, Agent, or Firm*—Westerman, Hattori, Daniels & Adrian, LLP

(57) ABSTRACT

An image processing apparatus includes a distortion correcting part for correcting pixels of image data having distortion due to distortion aberration characteristics of an optical system, and outputting corrected image data; a filtering part for applying a predetermined filtering process based on filter coefficients to the image data to be input into the distortion correcting part; and a filter coefficient setting part for setting, based on input distance data or relative coordinate data measured from a position corresponding to an optical center of the optical system to a target pixel for the filtering process on the image data, the filter coefficient which is used in the filtering part and is assigned to a position of the target pixel in accordance with the distortion aberration characteristics.

14 Claims, 16 Drawing Sheets

FIG. 2
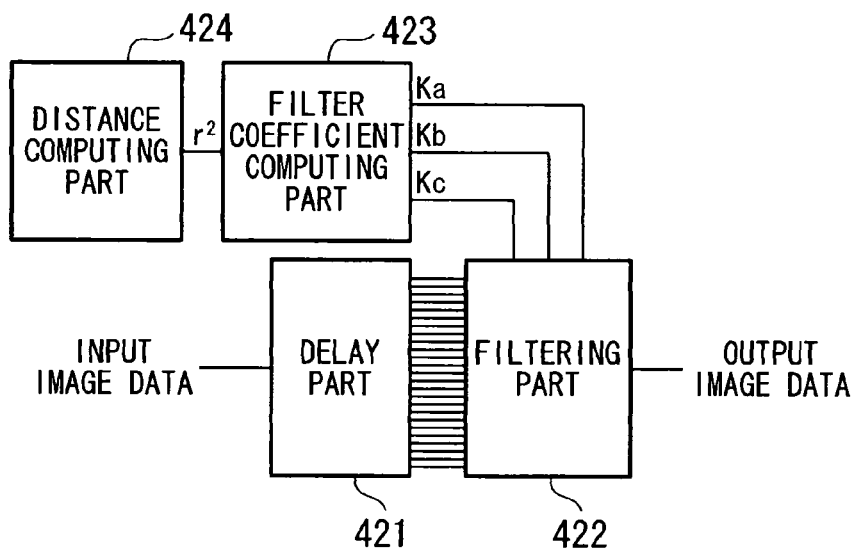
FIG. 3
| Ka^2 | KaKb | KaKc | KaKb | Ka^2 |
| KaKb | Kb^2 | KbKc | Kb^2 | KaKb |
| KaKc | KbKc | Kc^2 | KbKc | KaKc |
| KaKb | Kb^2 | KbKc | Kb^2 | KaKb |
| Ka^2 | KaKb | KaKc | KaKb | Ka^2 |
FIG. 4
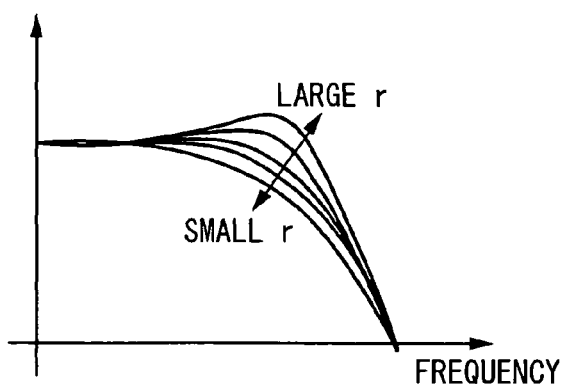

IMAGE PROCESSING APPARATUS AND METHOD FOR PREFERABLY CORRECTING DISTORTION ABERRATION

BACKGROUND OF THE INVENTION

1. Field of the Invention

The present invention relates to an image processing apparatus and a relevant method, and in particular, that which can be preferably applied to the correction of distortion aberration due to a lens of a digital camera or the like.

Priority is claimed on Japanese Patent Application No. 2005-338406, filed Nov. 24, 2005, the content of which is incorporated herein by reference.

2. Description of the Related Art

It is generally known that an optical system of a camera has a distortion aberration regardless of the type of camera (i.e., a digital camera or a film-based camera). Additionally, most presently-available cameras employ optical zooming in which the state of distortion aberration varies when the lens setting is changed from widest to longest. If the distortion aberration is a barrel-type characteristic, a checkered subject as shown in FIG. 27A is observed as an image shown in FIG. 28A, that is, the observed image has a barrel-type distortion.

Generally, images having such distortion aberration are not undesirable as images captured by cameras. Therefore, various methods for correcting the distortion aberration using image processing have been proposed. With respect to the barrel-type distortion aberration, in a specific example as shown in FIG. 26, positions of a captured image indicated by solid lines are corrected to positions indicated by dashed lines so as to cancel the aberration.

FIG. 25 is a block diagram showing the structure of an example of ordinary image processing apparatuses for performing image processing which includes distortion aberration correction. In FIG. 25, a preprocessing part 1 obtains evaluation values for an image obtained via a CCD (charge coupled device), which are used in processes such as AE (automatic exposure), AF (auto focus), AWB (auto white balancing), and the like. In addition, after performing OB clamping (black level determining process), defect pixel correction, and the like, the preprocessing part 1 stores processed image data into an SDRAM (synchronous dynamic random access memory) 3. A CPU (central processing unit) 2 computes values for exposure and focusing, R, G, and B gains, coefficients for white balancing, and the like, with reference to AE, AF, and AWB values.

The SDRAM 3 is a storage device for temporarily storing image data and the like.

An image processing part 4 extracts image data of a specific rectangular area among the image data stored in the SDRAM 3, and subjects the extracted data to some processes such as white balancing, shading correction, synchronization, filtering, and the like.

A DMA (direct memory access) part 41 as a constituent of the image processing part 4 reads data of the specific rectangular area of the image, and a first image processing part 42 executes image processing which is performed before the distortion correction. The first image processing part 42 includes a structure for performing filtering (specifically, an LPF (low pass filter) process) as shown in FIG. 24. In FIG. 24, a delay part 421 includes an FIFO (first-in first-out) memory, SRAM (static random access memory), and FF (flip flop). The delay part 421 extracts 25 pixels including a target pixel and its peripheral pixels, and a filtering part 422 executes a filtering process by multiplying the 25-pixel data by specific coefficients. This process is executed for each of the R, G, and B signals.

A distortion correcting part 5 subjects the R, G, and B signals input from the image processing part 4 to correction of distortion aberration, and a post-correction (i.e., post-distortion-correction) coordinate generating part 54 in this processing part 5 outputs coordinate data (e.g., of intersections between dashed lines in FIG. 26) on an image output after the distortion correction.

The signal output from the post-correction coordinate generating part 54 is simultaneously supplied to an R distortion correcting part 51, a G distortion correcting part 52, and a B distortion correcting part 53. These processing parts have an identical structure, and the R distortion correcting part 51 will be explained representatively.

A pre-correction (i.e., pre-distortion-correction) coordinate computing part 511 computes coordinate data (e.g., of intersections between solid lines in FIG. 26) on the image before the distortion correction. This coordinate data corresponds the coordinate data output from the post-correction coordinate generating part 54. That is, with respect to the pixel at coordinates (X, Y) on the image after the distortion correction, the pre-correction coordinate computing part 511 computes the corresponding position (X', Y') (of this pixel) on the image which has a distortion and is stored in a memory such as the SDRAM 3.

An address conversion part 512 computes address data for acquiring data of 16 peripheral pixels from the memory, which are close to the coordinates (X', Y') output from the pre-correction coordinate computing part 511.

A memory 513 has a group of two-port memories for storing color image data.

With respect to the data of 16 peripheral pixels output from the memory 513, an interpolation computing part 514 performs interpolation based on a by-cubic method, so as to output a corrected R signal. In this process, coefficients for interpolation are computed using a decimal part of the coordinates (X', Y').

An image processing part 6 subjects the image after the correction of distortion aberration to some processes such as edge enhancement, chroma suppressing, and the like. When signals of a Bayer image are synchronized by executing interpolation which uses peripheral pixels, the chroma suppressing process is performed for suppressing a (pseudo) color which should not appear originally but appears in the vicinity of an edge of the image. In this process, the level of each color signal component of relevant pixels in the vicinity of the edge is gradually suppressed.

The image processing part 6 consists of a second image processing part 61 and a DMA part 62. The second image processing part 61 executes image processing performed after the distortion correction, and the DMA part 62 outputs results of the processing to the SDRAM 3.

FIG. 23 shows an example of the structure of a circuit for performing the chroma suppressing. In FIG. 23, a matrix part 611 converts the R, G, and B signals into Y, Cr, and Cb signals for indicating brightness and color difference by using a 3×3 matrix. An edge determination part 612 is a circuit for determining the vicinity of an edge of the image based on the brightness signal (i.e., the Y signal). A suppress coefficient computing part 613 outputs a suppress coefficient so as to suppress pseudo colors with respect to pixels determined as being close to the edge. A multiplication part 614 multiplies the color component signals Cr and Cb by the coefficient supplied from the suppress coefficient computing part 613.

In accordance with the above structure, a rectangular image "a" having an arc-shape distortion (see dashed lines in FIG. 22A), which was stored from the preprocessing part 1 into the SDRAM 3, is corrected by the distortion correcting part 5 to a rectangular image "b" (see FIG. 22B). In FIG. 22A, the area indicated by a reference symbol "c" is the rectangular area extracted by the DMA part 41.

In the image processing parts 4 and 6 in FIG. 25, conventionally, image processing is executed without consideration of distortion of the image. However, when considering correction of the distortion aberration, as shown in FIG. 26, the correction is performed in a manner such that the central part is contracted while the peripheral part is expanded. Therefore, in comparison with the central part, the peripheral part of the image has less high-frequency signal components and thus is blurred. With respect to this phenomenon, a known image processing technique such as outline correction may be applied to the image before the correction of distortion aberration (see, for example, Japanese Unexamined Patent Application, First Publication No. 2004-272578).

Also in conventional techniques, when a filtering process (5×5) is performed using adjacent pixels in image processing (performed by the image processing part 4 in the example shown in FIG. 25) before the correction of distortion aberration, if the distortion aberration is a barrel type, the adjacent pixels existing in a central part of the image are positioned as shown in 21A after the correction of distortion aberration. In contrast, in a peripheral part having a large distortion aberration, if the distortion aberration is such a barrel type, the adjacent pixels are positioned as shown in 22A after the correction of distortion aberration.

SUMMARY OF THE INVENTION

The present invention provides an image processing apparatus comprising:
  a distortion correcting part for correcting pixels of image data having a distortion due to distortion aberration characteristics of an optical system, and outputting corrected image data;
  a filtering part for applying a predetermined filtering process based on filter coefficients to the image data to be input into the distortion correcting part; and
  a filter coefficient setting part for setting, based on input distance data or relative coordinate data measured from a position corresponding to an optical center of the optical system to a target pixel for the filtering process on the image data, the filter coefficient which is used in the filtering part and is assigned to a position of the target pixel in accordance with the distortion aberration characteristics.

Preferably, the filter coefficient setting part assigns the filter coefficient so as to provide substantially uniform spatial frequency characteristics over the whole area with respect to the image data output from the distortion correcting part.

In a typical example, the filter coefficient setting part assigns the filter coefficient in accordance with a distance between pixels on the image data output from the distortion correcting part, which corresponds to a distance between pixels on the image data input into the distortion correcting part.

Preferably, the image processing apparatus further comprises:
  a chroma suppressing part for assigning, based on input distance data or relative coordinate data measured from the position corresponding to the optical center to a specific pixel positioned in the vicinity of an edge with respect to the image data output from the distortion correcting part, a suppress coefficient for suppressing a pseudo color to the specific pixel in accordance with an amount of distortion aberration with respect to the distortion aberration characteristics, so as to suppress the pseudo color of the specific pixel based on the suppress coefficient.

In a preferable example of this case, the chroma suppressing part assigns the suppress coefficient in a manner such that the larger the amount of distortion aberration, the more strongly the pseudo color is suppressed.

In another preferable example, the chroma suppressing part assigns the suppress coefficient in a manner such that the larger the amount of distortion aberration, the wider an area where the pseudo color is suppressed is determined.

In another preferable example, based on the distance data or the relative coordinate data from the position corresponding to the optical center to the specific pixel, the distortion correcting part computes image data in which a distortion at the specific pixel has been corrected.

In a typical example, the optical system includes a group of lenses having independent distortion aberration characteristics with respect to directions which are perpendicular to each other on a plane, wherein the distortion aberration characteristics are rotationally asymmetrical, and the plane has a normal which coincides with the optical center.

The present invention also provides an image processing method comprising:
  a distortion correcting step of correcting pixels of image data having a distortion due to distortion aberration characteristics of an optical system, and outputting corrected image data;
  a filtering step of applying a predetermined filtering process based on filter coefficients before the distortion of the image data is corrected in the distortion correcting step; and
  a filter coefficient setting step of setting, based on input distance data or relative coordinate data measured from a position corresponding to an optical center of the optical system to a target pixel for the filtering process on the image data, the filter coefficient which is used in the filtering step and is assigned to a position of the target pixel in accordance with the distortion aberration characteristics.

Preferably, in the filter coefficient setting step, the filter coefficient is assigned so as to provide substantially uniform spatial frequency characteristics over the whole area with respect to the image data output in the distortion correcting step.

In a typical example, in the filter coefficient setting step, the filter coefficient is assigned in accordance with a distance between pixels on the image data output in the distortion correcting step, which corresponds to a distance between pixels on the image data input in the distortion correcting step.

Preferably, the image processing method further comprises:
  a chroma suppressing step of assigning, based on input distance data or relative coordinate data measured from the position corresponding to the optical center to a specific pixel positioned in the vicinity of an edge with respect to the image data output in the distortion correcting step, a suppress coefficient for suppressing a pseudo color to the specific pixel in accordance with an amount of distortion aberration with respect to the distortion aberration characteristics, so as to suppress the pseudo color of the specific pixel base on the suppress coefficient.

In a preferable example of this case, in the chroma suppressing step, the suppress coefficient is assigned in a manner such that the larger the amount of distortion aberration, the more strongly the pseudo color is suppressed.

In another preferable example, in the chroma suppressing step, the suppress coefficient is assigned in a manner such that the larger the amount of distortion aberration, the wider an area where the pseudo color is suppressed is determined.

In another preferable example, the distortion correcting step includes computing image data in which a distortion at the specific pixel has been corrected based on the distance data or the relative coordinate data from the position corresponding to the optical center to the specific pixel.

In a typical example, the optical system includes a group of lenses having independent distortion aberration characteristics with respect to directions which are perpendicular to each other on a plane, wherein the distortion aberration characteristics are rotationally asymmetrical, and the plane has a normal which coincides with the optical center.

BRIEF DESCRIPTION OF THE DRAWINGS

FIG. 2 is a block diagram showing the structure of an example of an LPF processing part in the image processing apparatus of the first embodiment.

FIG. 3 is a diagram showing an example of filter coefficients used in the first embodiment.

FIG. 4 is a diagram showing an example of filtering characteristics used in the first embodiment.

DESCRIPTION OF THE PREFERRED EMBODIMENTS

Hereinafter, embodiments of the image processing apparatus in accordance with the present invention will be described with reference to the appended figures.

First Embodiment

Figure 1:
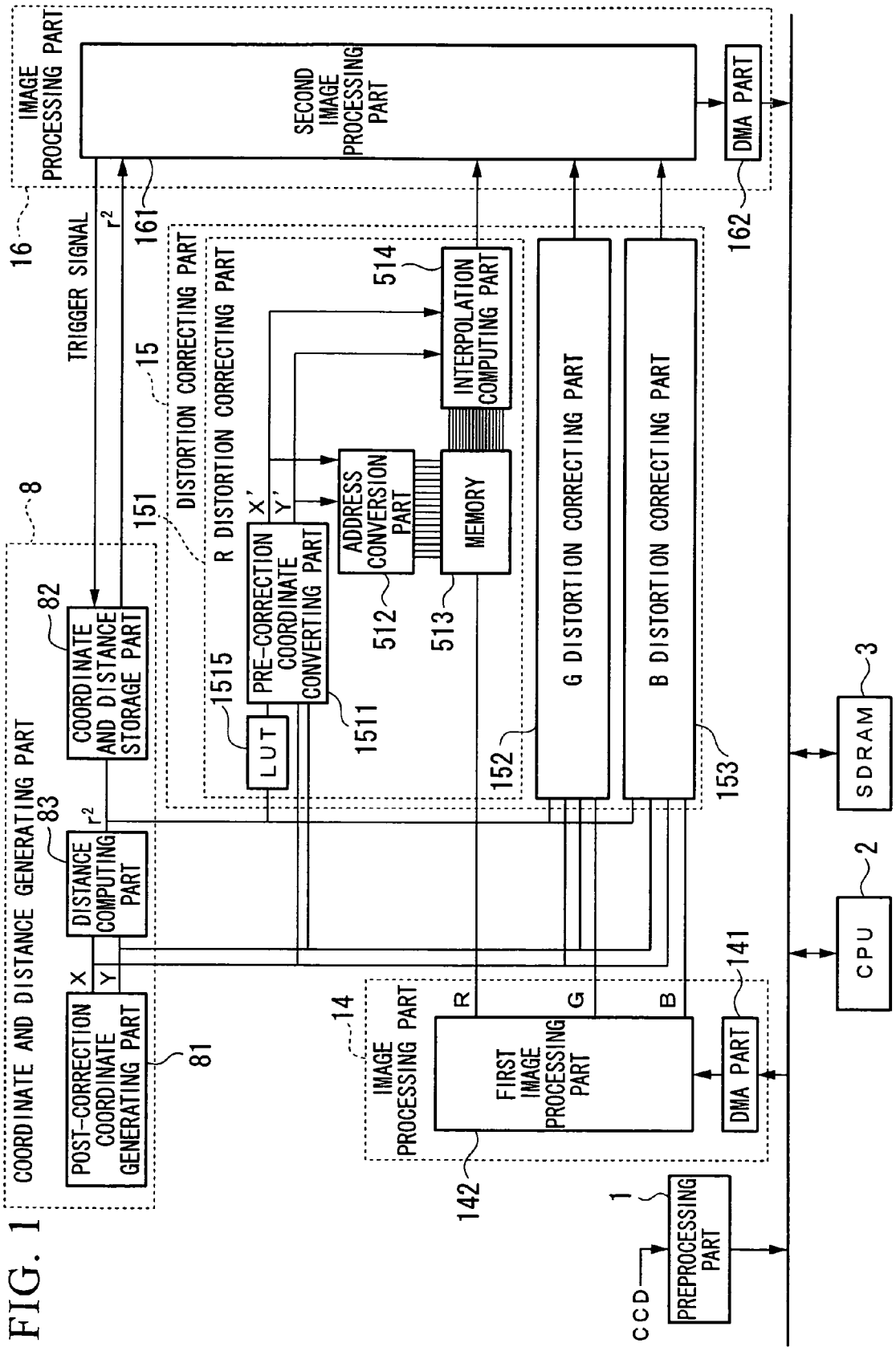
FIG. 1 is a block diagram showing the structure of an image processing apparatus as a first embodiment in accordance with the present invention.
Figure 5:
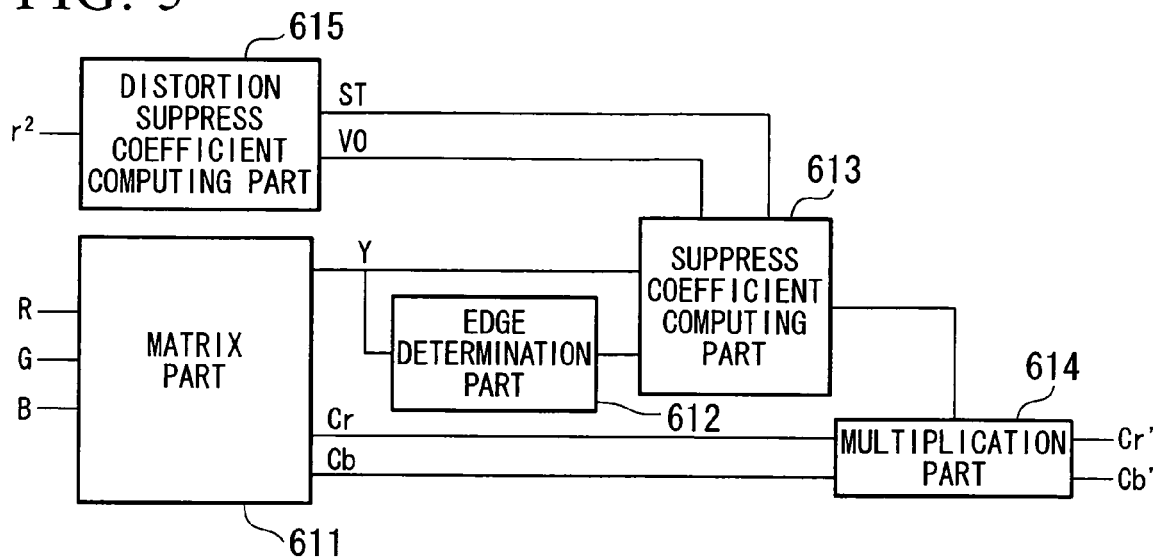
FIG. 5 is a block diagram showing the structure of an example of a chroma suppressing part in the image processing apparatus of the first embodiment.

As shown in FIG. 1, the image processing apparatus of the present embodiment has a preprocessing part 1, a CPU 2, an SDRAM 3, an image processing part 14, a distortion correcting part 15, an image processing part 16, and a coordinate and distance generating part 8.

The image processing part 14 consists of a first image processing part 142 and a DMA part 141.

The distortion correcting part 15 consists of an R distortion correcting part 151, a G distortion correcting part 152, and a B distortion correcting part 153, which each have a pre-correction (i.e., pre-distortion-correction) coordinate converting part 1511, an address conversion part 512, a memory 513, an interpolation computing part 514, and an LUT (look up table) 1515.

The image processing part 16 consists of a second image processing part 161 and a DMA part 162. The coordinate and distance generating part 8 consists of a post-correction (i.e., post-distortion-correction) coordinate generating part 81, a distance computing part 83, and a coordinate and distance storage part 82.

Figure 25:
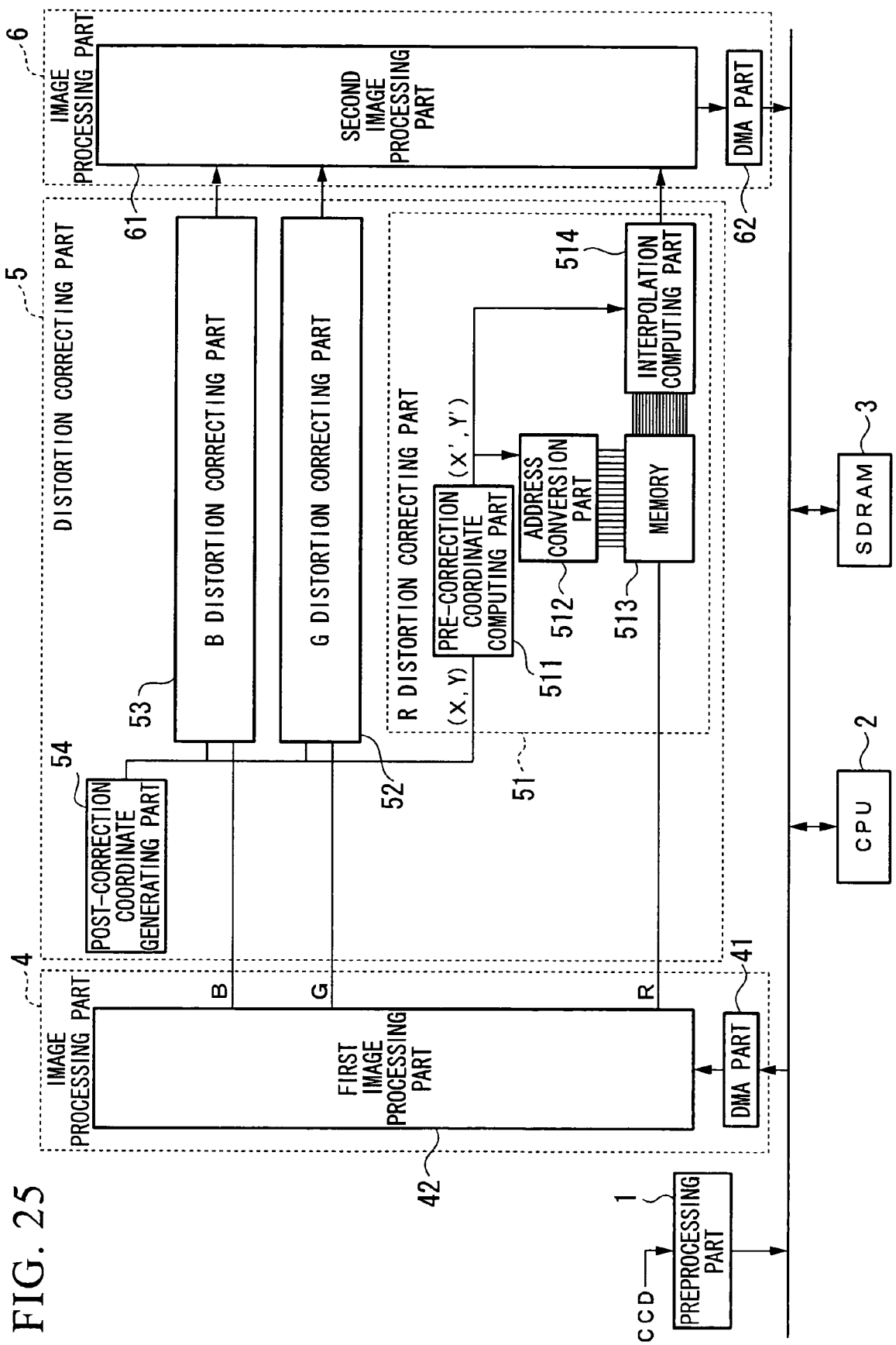
FIG. 25 is a block diagram showing the structure of an image processing apparatus in the conventional example.
Figure 26:
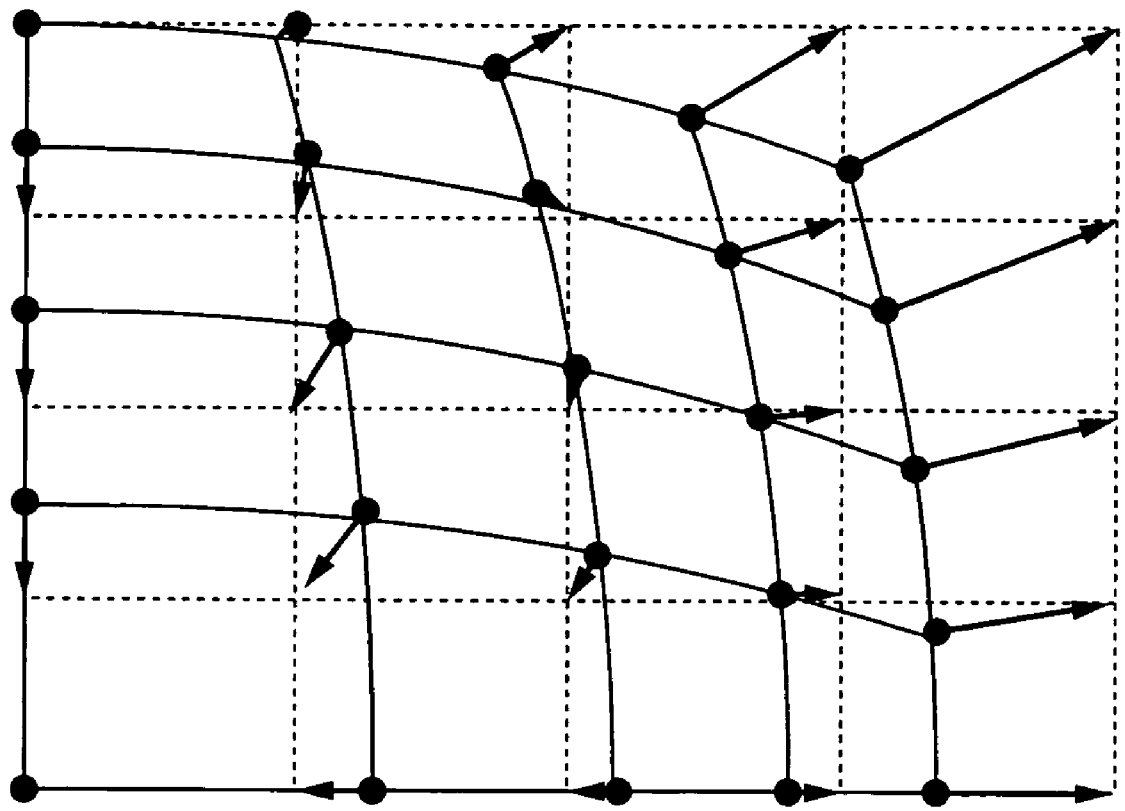
FIG. 26 is a diagram for explaining a method of correcting the distortion aberration when there is a barrel-type distortion aberration.
Figure 27A:
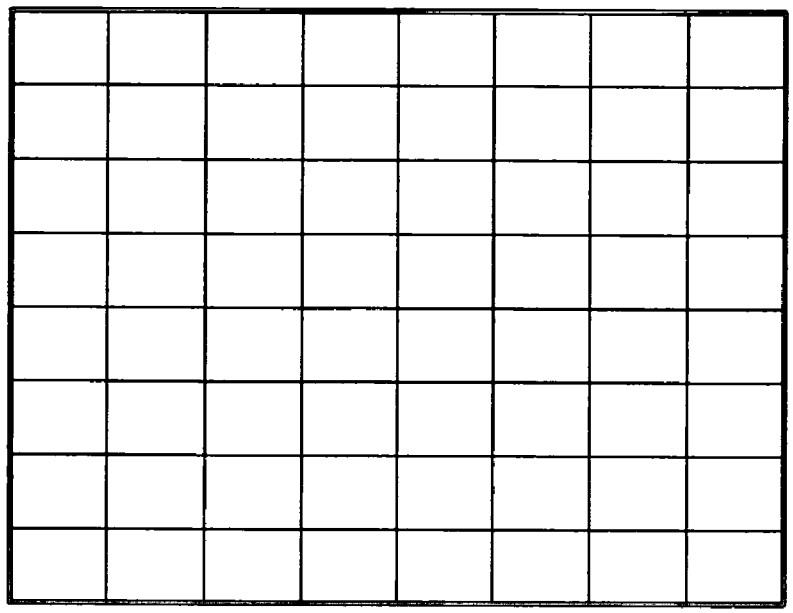
FIGS. 27A and 27B respectively show a subject and a captured image thereof when the subject is photographed using the optical system having a distortion aberration.
Figure 27B:
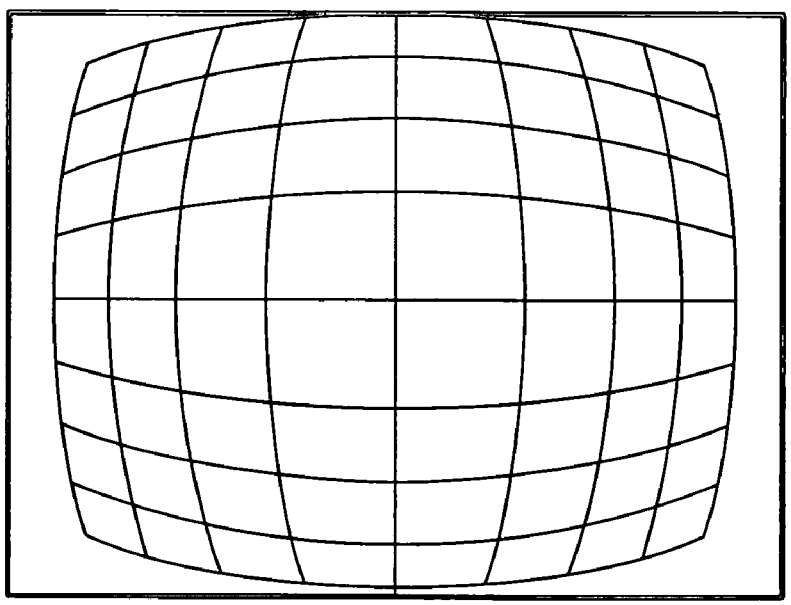

In FIG. 1, parts indicated by identical reference numerals to those in FIG. 25 have identical functions, and detailed explanations thereof are omitted.

The coordinate and distance generating part 8 computes coordinate and distance values on an image after the correction of distortion aberration (i.e., post-correction coordinate and distance values), and stored computed values. In this coordinate and distance generating part 8, the post-correction coordinate generating part 81 generates coordinate data (X, Y) on the image after the correction of distortion aberration (i.e., post-correction coordinate data (X, Y)). Based on the coordinate data (X, Y) supplied from the post-correction coordinate generating part 81, the distance computing part 83 computes a distance "r" from the optical center. Generally, a circuit for computing a square root causes an increase in the size of the whole circuit. Therefore, in consideration of operations performed later, the square of the distance (i.e., $r^2$) may be computed. In the present embodiment, the case of computing the square of the distance ($r^2$) will be explained.

The coordinate and distance storage part 82 has an FIFO memory, an SRAM, or the like, for storing the distance data ($r^2$). The coordinate and distance storage part 82 outputs the distance data ($r^2$) successively to the second image processing part 161 when receiving each trigger signal from the second image processing part 161.

The first image processing part 142 performs some processes such as white balancing, shading correction, synchronization, LPF (low pass filter) processing, and the like.

FIG. 2 shows an example of an LPF processing part, which includes a delay part 421, a filtering part 422, a filter coefficient computing part 423 (i.e., a filter coefficient setting part), and a distance computing part 424.

The delay part 421 includes an FIFO, an SRAM, an FF, and the like, so as to extract 25 pixels including a target pixel and its peripheral pixels. The filtering part 422 multiplies each of the 25-pixel data items (extracted by the delay part 421) by one of 5 kinds of coefficients defined based on the signals output from the filter coefficient computing part 423, so as to perform the filtering. FIG. 3 shows an example of 25 filter coefficients.

The filter coefficient computing part 423 computes filter coefficients Ka, Kb, and Kc so as to obtain substantially uniform spatial frequency characteristics for the image after the correction of distortion aberration. Conceptually, in order to obtain uniform spatial frequency characteristics, the filter coefficients are output for realizing filtering characteristics in which the area close to the optical axis (i.e., the optical center) has larger low-frequency signal components, and the more distant from the optical center, the more strongly the high-frequency signal components are emphasized. An example of such filtering characteristics is shown in FIG. 4.

As shown in FIG. 4, the larger the distance (r) from the optical center, the more strongly the high-frequency signal components are emphasized. Therefore, actually, different characteristics assigned to different distances are stored in advance, and linear interpolation between relevant different characteristics is performed in accordance with the distance from the optical center, so as to smoothly connect the characteristics and realize a unique filtering characteristic for each distance. The distance computing part 424 computes the distance ($r^2$) from the optical center based on the coordinates of the input image data.

The distortion correcting part 15 subjects each of the R, G, and B signals, input from the image processing part 14, to distortion correction.

The LUT 1515 is a table which outputs a parameter F for correcting the distortion aberration, with respect to the distance data ($r^2$) supplied from the distance computing part 83 in the coordinate and distance generating part 8.

Based on the parameter F output from the LUT 1515 and the coordinate data (X, Y) output from the post-correction coordinate generating part 81 in the coordinate and distance generating part 8, the pre-correction coordinate converting part 1511 computes pre-correction (i.e., pre-distortion-correction) coordinates (X', Y') by using formulas "X'=FX", and "Y'=FY". In the present embodiment, the LUT 1515 is provided in advance; however, processing using arithmetic operations may be performed without providing the LUT 1515.

The second image processing part 161 executes some processes such as edge enhancement and chroma suppressing. The coordinate and distance data corresponding to the image data supplied from the distortion correcting part 15 to the second image processing part 161 is obtained by applying an appropriate delay to the data generated by the coordinate and distance generating part 8. Therefore, the second image processing part 161 outputs a trigger signal to the coordinate and distance storage part 82 so as to obtain the distance data ($r^2$). Accordingly, in the present embodiment, the distance computing part 83, which requires a relatively large circuit size, is commonly used between the coordinate and distance generating part 8 and the image processing part 16, thereby suppressing an increase in the circuit size.

The second image processing part 161 includes a chroma suppressing part which has a matrix part 611, an edge determination part 612, a suppress coefficient computing part 613, a multiplication part 614, and a distortion suppress coefficient computing part 615. Generally, chroma suppressing is applied uniformly to the vicinity of a relevant edge. However, in the present embodiment, the larger the distance from the optical center, the more strongly the chroma suppressing is applied.

The matrix part 611 converts the R, G, and B signals into Y, Cr, and Cb signals for indicating brightness and color difference by using a 3×3 matrix. The edge determination part 612 is a circuit for determining the vicinity of an edge of the image based on the brightness signal (i.e., the Y signal).

The suppress coefficient computing part 613 outputs a suppress coefficient so as to suppress pseudo colors with respect to the pixels determined as being close to the edge.

The multiplication part 614 multiplies the color component signals Cr and Cb by the suppress coefficient.

Figure 6:
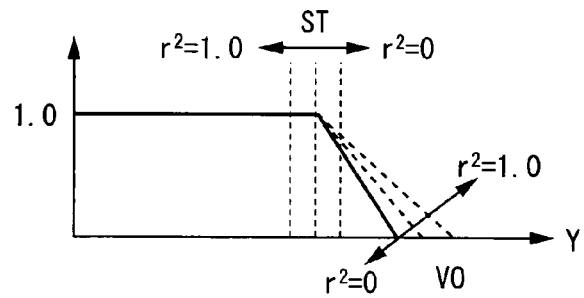
FIG. 6 is a diagram showing relationships between the brightness level and parameters ST and VO.

The distortion suppress coefficient computing part 615 receives the distance data ($r^2$) and outputs parameters ST and VO for changing the suppress coefficient in accordance with the amount of distortion aberration. As shown in FIG. 6, these parameters change the suppress coefficient computed by the suppress coefficient computing part 613.

In FIG. 6, the horizontal axis indicates a brightness level (see "Y", and the closer to the right end of the axis, the higher the brightness level), and the vertical axis indicates an amount of attenuation (i.e., the degree of suppression). Also in FIG. 6, "ST" indicates the brightness level at which the suppression starts, and "VO" indicates the gradient of the suppress coefficient characteristic with respect to the brightness level higher than ST. As indicated by the dashed lines in FIG. 6, the more distant from the optical center, the smaller the value of ST and also the gradient indicated by VO.

Therefore, in the present embodiment, the filtering process applied to specific pixels is appropriately controlled in accordance with the distance from the optical center; thus, appropriate image processing can be performed even when the optical system has a distortion aberration. With respect to the chroma suppression, the suppress coefficient is also appropriately controlled in accordance with the distance from the optical center. Therefore, when the optical system has a distortion aberration, it is possible to effectively suppress pseudo colors appearing in the vicinity of edges.

Second Embodiment

In comparison with the first embodiment, the image processing apparatus of the present embodiment has distinctive structures for the chroma suppressing circuit and the filtering circuit. Generally, when the distortion aberration is corrected, pseudo colors appear in a larger area and edges are less clear (i.e., dull) in the peripheral part of the image, in comparison with the central part thereof. Therefore, in the suppression of the present embodiment, the larger the distance from the optical center, the looser the edge determination condition defined (i.e., a condition by which an edge is more readily determined is defined) and the larger the area determined as a vicinity of the edge.

Figure 7:
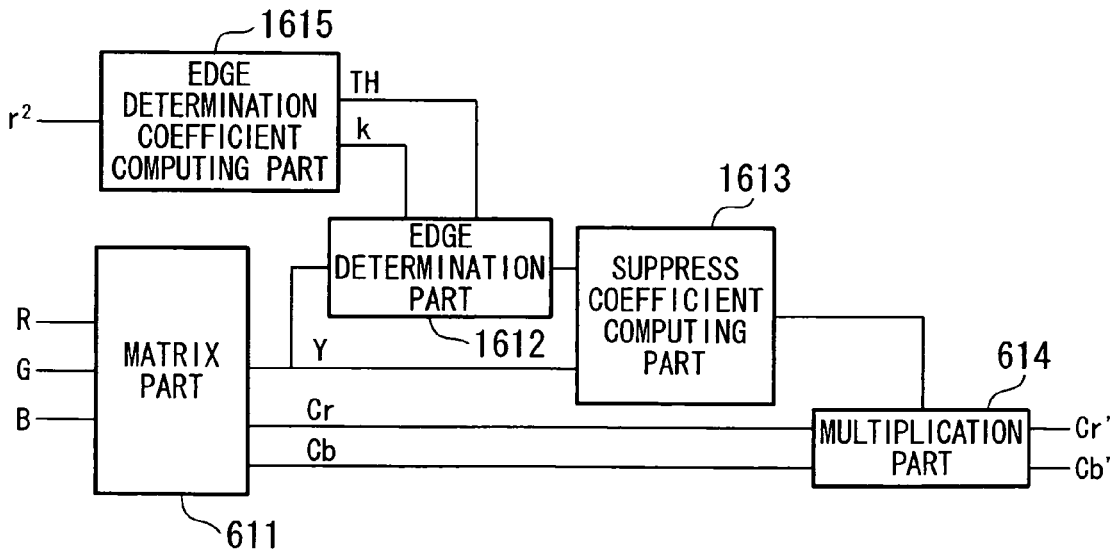
FIG. 7 is a block diagram showing the structure of an example of a chroma suppressing part in an image processing apparatus as a second embodiment in accordance with the present invention.

As shown in FIG. 7, the chroma suppressing part includes a matrix part 611, an edge determination part 1612, a suppress coefficient computing part 1613, a multiplication part 614, and an edge determination coefficient computing part 1615. In FIG. 7, parts given identical reference numerals to those in the first embodiment have identical functions, and detailed explanations thereof are omitted.

The edge determination coefficient computing part 1615 outputs an area "k" to which the chroma suppression is applied and an edge determination condition TH, with respect to the square of the distance ($r^2$). The image is not expanded in its central part; thus, the edge is not planarized; however, the image is expanded in its peripheral part; thus, the edge is planarized. In consideration of this phenomenon, the edge determination condition becomes more permissible in the peripheral part. Also in comparison with the central part, the peripheral part has a larger chromatic aberration; thus, pseudo colors also appear at an area distant from the edge. Therefore, as shown in FIG. 8, the coefficients TH and k are computed in a manner such that (i) with respect to the central part of the image, a stricter edge determination condition is applied and a narrower area for the chroma suppression is defined in the vicinity of the edge, and (ii) with respect to the peripheral part of the image, a looser edge determination condition is applied and a wider area for the chroma suppression is defined in the vicinity of the edge.

Figure 8:
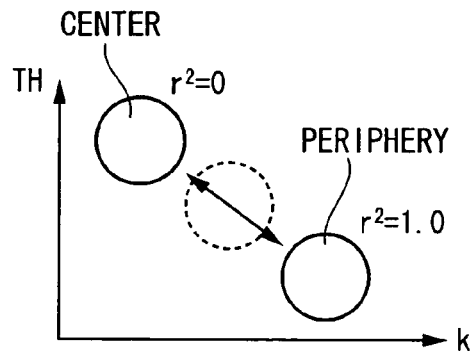
FIG. 8 is a diagram showing a relationship between coefficients TH and k.

FIG. 8 shows a relationship between the coefficients TH and k which are defined both in the central part and the peripheral part of the image. In FIG. 8, the vertical axis TH indicates the variation in brightness (for determining an edge), and the horizontal axis "k" indicates the distance from the edge. As shown in FIG. 8, with respect to the vicinity of the optical center, (i) k is small, that is, the area determined as the vicinity of the edge is narrow, and (ii) TH is large, that is, the condition for determining the edge is strict. In contrast, with respect to the peripheral part, (i) k is large, that is, the area determined as the vicinity of an edge is wide, and (ii) TH is small, that is, the condition for determining the edge is more permissible.

The edge determination part 1612 receives the above TH and k from the edge determination coefficient computing part 1615, and also receives the brightness signal Y, so as to determine whether a target pixel is present in the vicinity of an edge, by using an edge extracting filter. The suppress coefficient computing part 1613 receives the result of the determination performed by the edge determination part 1612 and also receives the brightness signal Y, so as to compute a suppress coefficient. The multiplication part 614 multiplies each of the color component signals Cr and Cb by the suppress coefficient.

Additionally, in the image processing apparatus of the present embodiment, filtering is executed in consideration not only of the distance from the optical center, but also of a variation in the distance between adjacent pixels in accordance with the direction.

Figure 9:
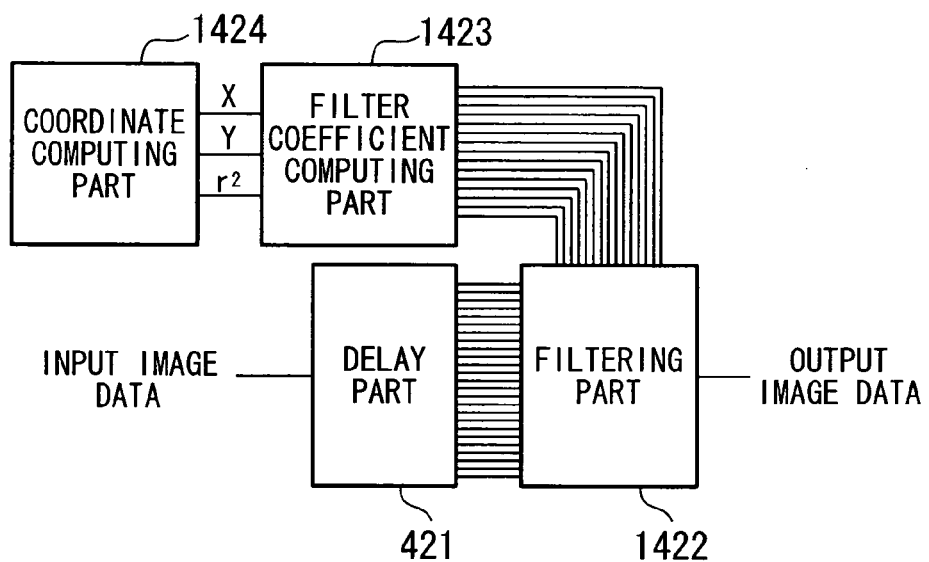
FIG. 9 is a block diagram showing the structure of an example of an LPF processing part in the image processing apparatus of the second embodiment.

More specifically, as shown in FIG. 9, the structure for performing the filtering includes a coordinate computing part 1424, a filter coefficient computing part 1423 (i.e., a filter coefficient setting part), a delay part 421, and a filtering part 1422. Here, parts given identical reference numerals to those of the conventional example and the first embodiment have identical functions, and detailed explanations thereof are omitted.

The coordinate computing part 1424 outputs the coordinate data (X, Y) and the distance data ($r^2$) of a target pixel to the filter coefficient computing part 1423.

The filter coefficient computing part 1423 receives the distance data ($r^2$) measured from the optical center and the coordinate data (X, Y) used for determining the direction, so as to compute filter coefficients. In the present embodiment, 25 coefficients are output because the setting of filter coefficients is not limited to a rotational symmetry form as employed in the first embodiment (see FIG. 3).

Below, the setting of filter coefficients in the present embodiment will be explained in detail with reference to FIGS. 10 to 14.

Figure 10:
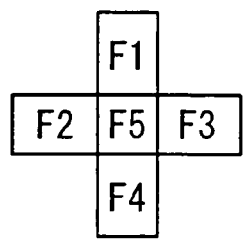
FIG. 10 is a diagram showing an example of the filter coefficient arrangement used in the second embodiment.
Figure 11:
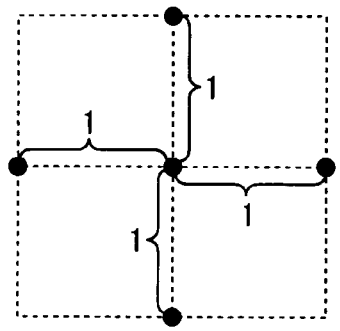
FIG. 11 is a diagram showing a pixel arrangement at an optical central part of the image after the correction of distortion aberration.

In the following explanation, filtering is performed using only the target pixel and four adjacent pixels thereof (i.e., adjacent pixels on the upper, lower, right, and left sides of the target pixel). In this example, the filter coefficients are defined as a cross form as shown in FIG. 10 (in which F1 to F5 are coefficients). It is assumed that the value of each coefficient is: F1=F2=F3=F4=0.125, and F5=0.5. In an optically central part, little distortion aberration occurs; thus, it can be determined that the pixels are positioned at regular intervals (see FIG. 11) even after the correction of distortion aberration. Therefore, in this case, filtering is performed using ordinary filter coefficients.

Figure 12:
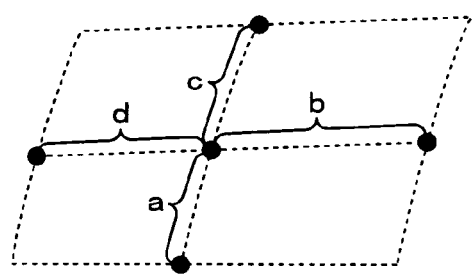
FIG. 12 is a diagram showing a pixel arrangement at a peripheral part of the image after the correction of distortion aberration.
Figure 13:
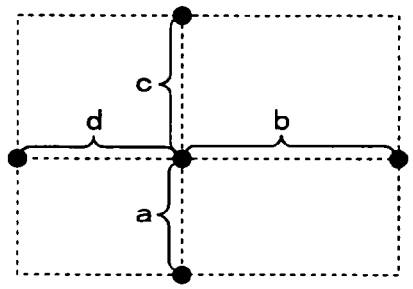
FIG. 13 is a diagram showing a simplified form equivalent to FIG. 12.

In contrast, in the upper-right end of the image, a distortion as shown in FIG. 12 occurs after the correction of distortion aberration, that is, the distances between the pixels are not uniform (see "a" to "d" in FIG. 12); thus, the filter coefficient defined in accordance with the distance is multiplied. In FIG. 12, the upper-lower axis and the right-left axis are not perpendicular to each other, and generation of the filter coefficient is complex. Here, the complex condition is simplified to a form as shown in FIG. 13. In this case, the filter coefficients may have the following relationships:

$$F1+F4=M/4,\ F2+F3=M/4,\ aF1=cF4,\ bF2=dF3$$

where M is a parameter (constant) depending on the distance between the pixels.

When it is assumed that 1<a<b, c, d (that is, a is larger than 1 and smallest among a to d), the following formula may be defined:

$$cF1+dF2+bF3+dF4=0.5/a$$

In this case, F1, F2, F3, and F4 can be computed using the above five formulas, as follows:

$$F1=c/(4a(a+c))$$

$$F2=d/(4a(b+d))$$

$$F3=b/(4a(b+d))$$

$$F4=a/(4a(a+c))$$

Figure 14:
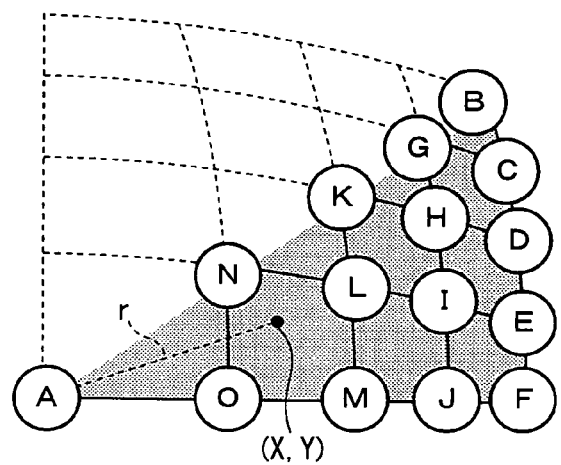
FIG. 14 is a diagram showing an example of the filter coefficient arrangement.

In accordance with the above relationships, filter coefficients assigned to the positions of points C to O in FIG. 14

(i.e., except for the positions of points A and B in FIG. 14) are computed in advance. Here, the filter coefficients has a rotational symmetry relationship; thus, as shown in FIG. 14, filter coefficients assigned only to half of the first quadrant are required. Additionally, the area for which the filter coefficients are computed is not limited to that shown in FIG. 14.

Based on the received coordinate data (X, Y) and distance data ($r^2$), the filter coefficient computing part 1423 acquires some of the filter coefficients, which are present closest, and performs interpolation between the obtained coefficients so as to generate a filter coefficient applied to the target pixel. For example, in the example of FIG. 14, a desired filter coefficient is generated by executing a weighted averaging operation using the filter coefficients corresponding to the points N, L, O, and M around the target pixel.

Therefore, in accordance with the present embodiment, chroma suppression is performed in a manner such that the larger the distance from the optical center, the more permissible the edge determination condition and also the wider the area determined as the vicinity of the edge. Accordingly, it is possible to suppress the pseudo colors from appearing in a wide area belonging to the peripheral part of the image, and also to reduce the appearance of a dull edge.

In addition, in the filtering, the filter coefficients are computed in consideration of not only the distance from the optical center, but also the coordinate data, thereby preferably handling the case in which the distance between the adjacent pixels varies in accordance with the direction.

Third Embodiment

Figure 15:
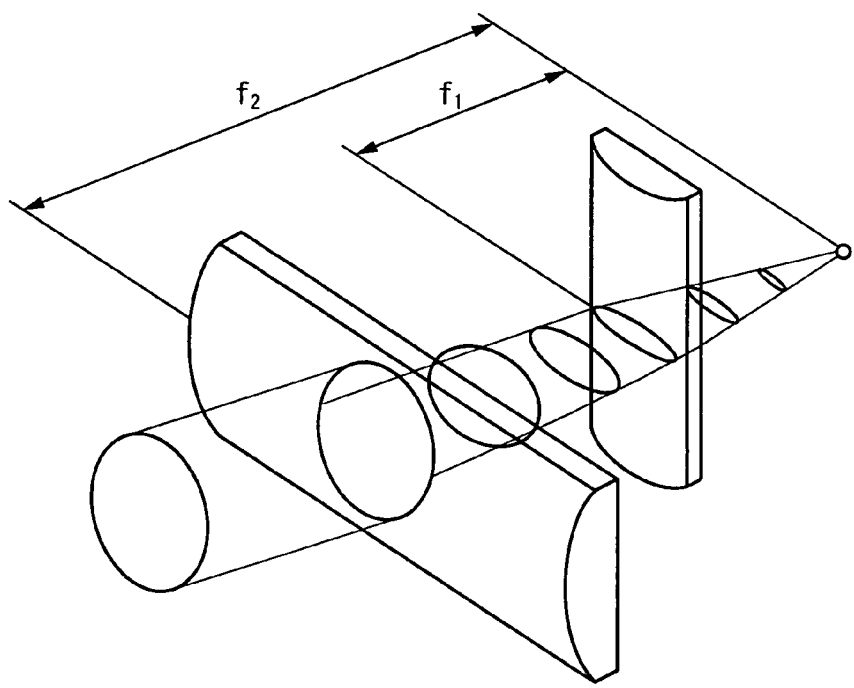
FIG. 15 is a diagram showing the structure of an optical system employed in a third embodiment in accordance with the present invention.
Figure 20A:
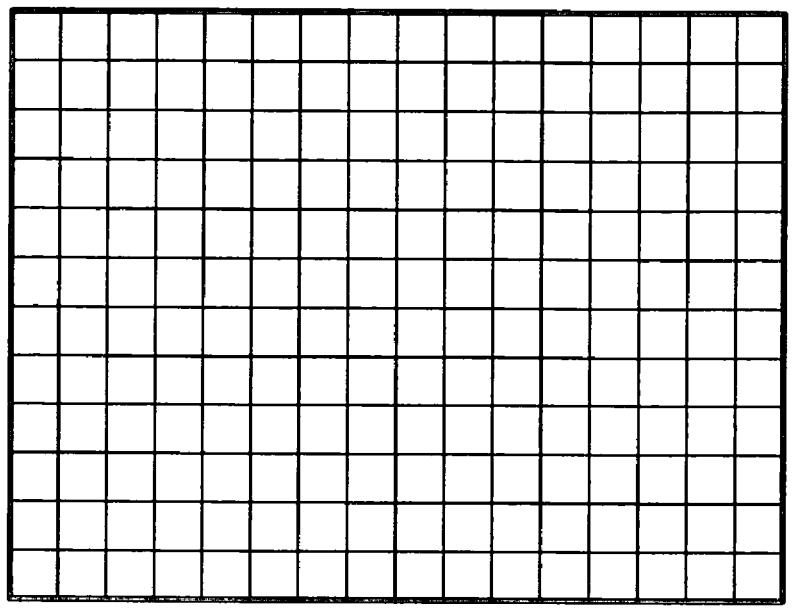
FIGS. 20A and 20B respectively show a subject and a captured image thereof when the subject is photographed using the optical system having a distortion aberration in the third embodiment.
Figure 20B:
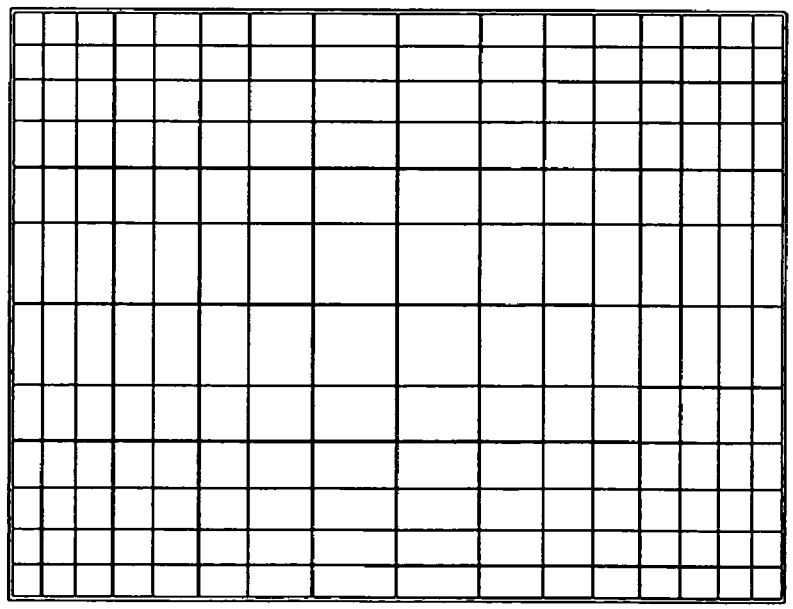
Figure 21A:
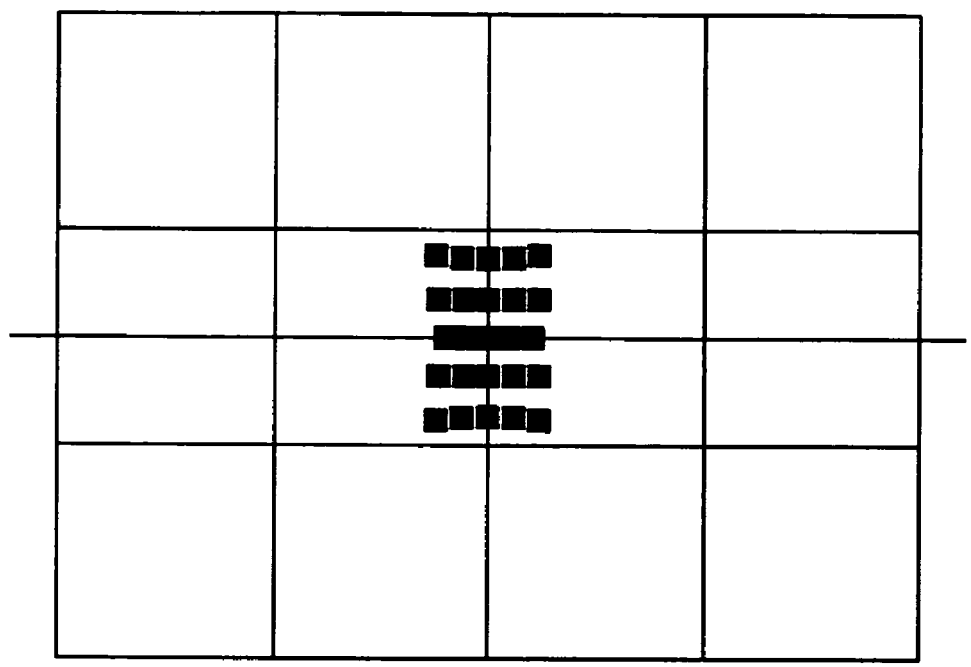
FIGS. 21A and 21B respectively show pixel arrangements before and after the correction of distortion aberration when the optical system has a barrel-type distortion aberration.
Figure 21B:
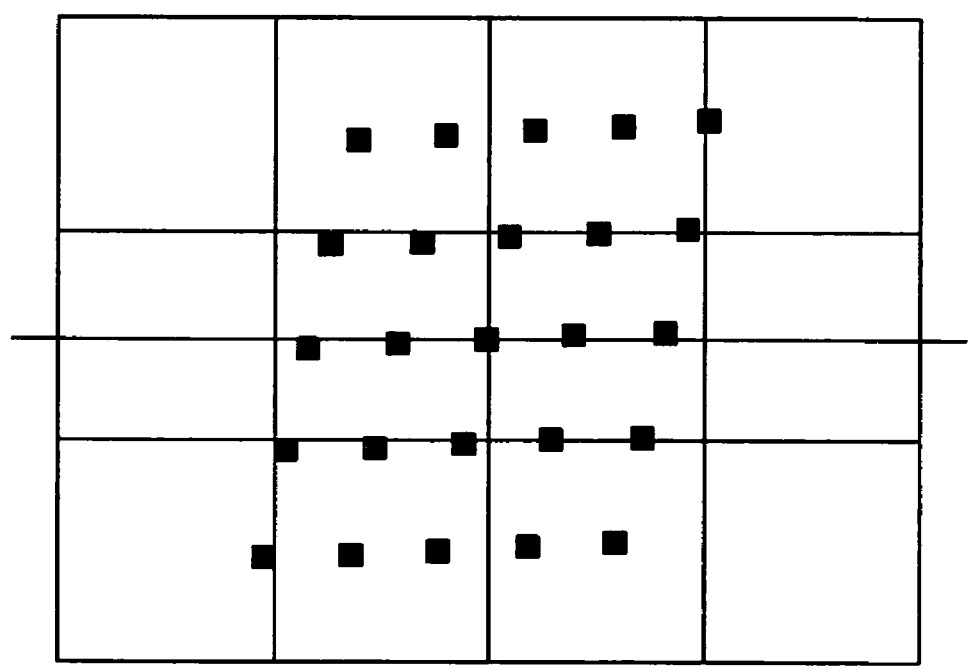
Figure 22A:
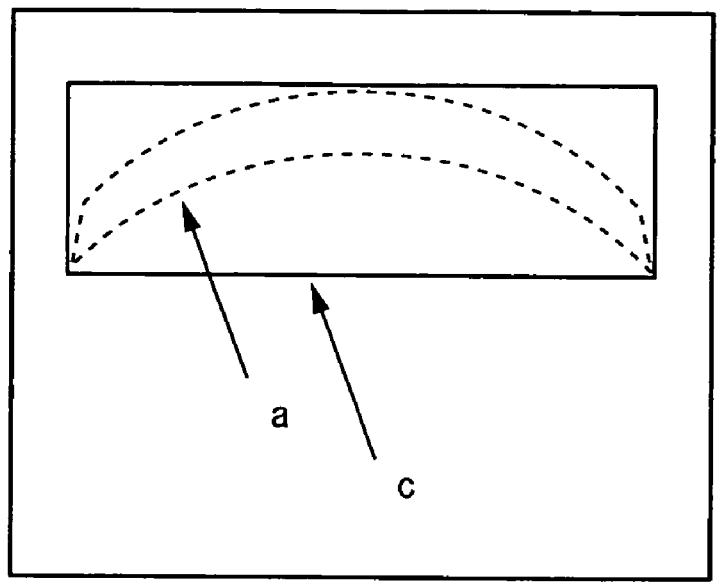
FIGS. 22A and 22B respectively show images before and after the correction of distortion aberration in a conventional example.
Figure 22B:
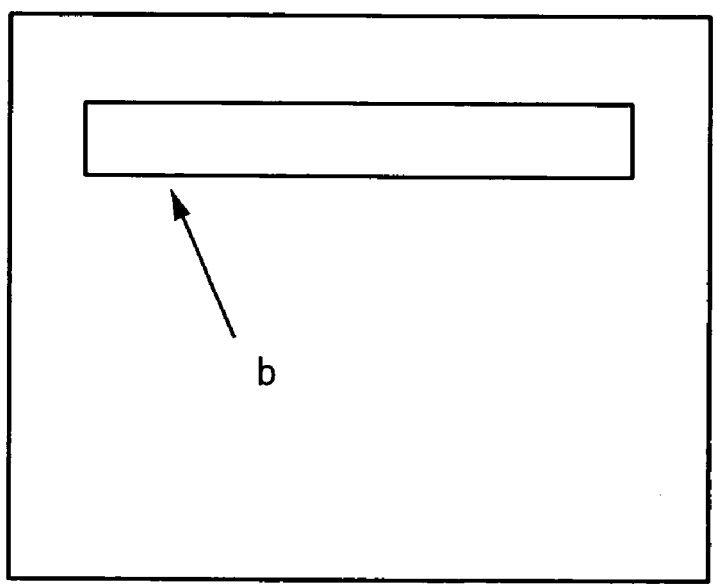
Figure 23:
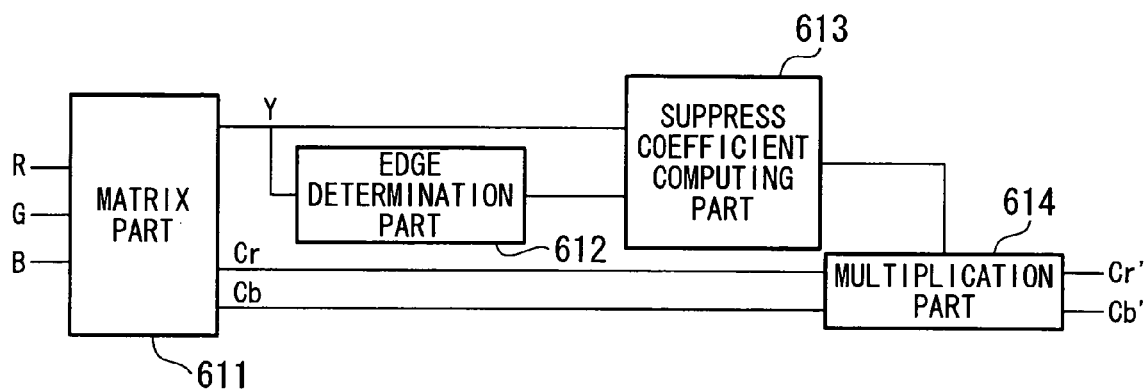
FIG. 23 is a block diagram showing the structure of an example of a chroma suppressing part in the conventional example.
Figure 24:
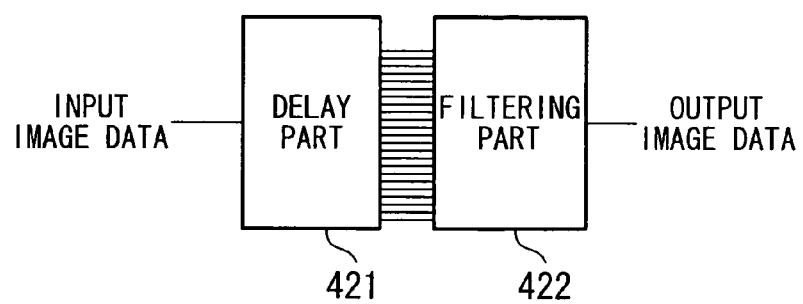
FIG. 24 is a block diagram showing the structure of an example of an LPF processing part in the conventional example.

This embodiment relates to an image processing apparatus employing cylindrical lenses as shown in FIG. 15 in the optical system, so as to generate a distortion aberration. These lenses have a characteristic for converting a checkered subject as shown in FIG. 20A into an image having a distortion as shown in FIG. 20B. In accordance with such a distortion aberration, the whole photodetective plane of the imaging device such as a CCD which has a rectangular image plane can be effectively used without waste.

Figure 19:
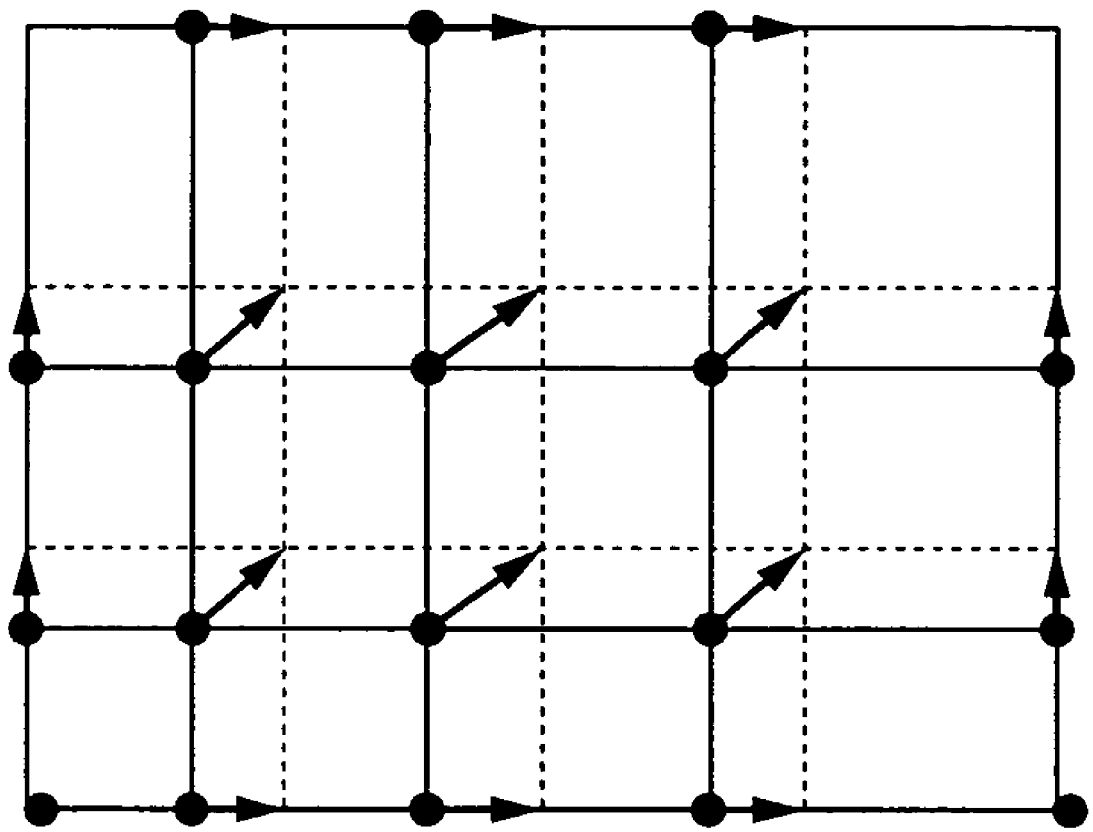
FIG. 19 is a diagram for explaining a method of correcting the distortion aberration in the third embodiment.

In order to correct distortion of the above optical system, each position of the image indicated by solid lines in FIG. 19 is corrected to the corresponding position indicated by dashed lines, so as to cancel the aberration. In this case, distortion aberration occurs independently in the X and Y directions; thus, the X and Y values can be directly regarded as the horizontal and vertical distances (r). In the present embodiment, in consideration of the above, the distortion aberration is corrected based on the distance data (X, Y) (i.e., using independent two routes of distance data).

Figure 16:
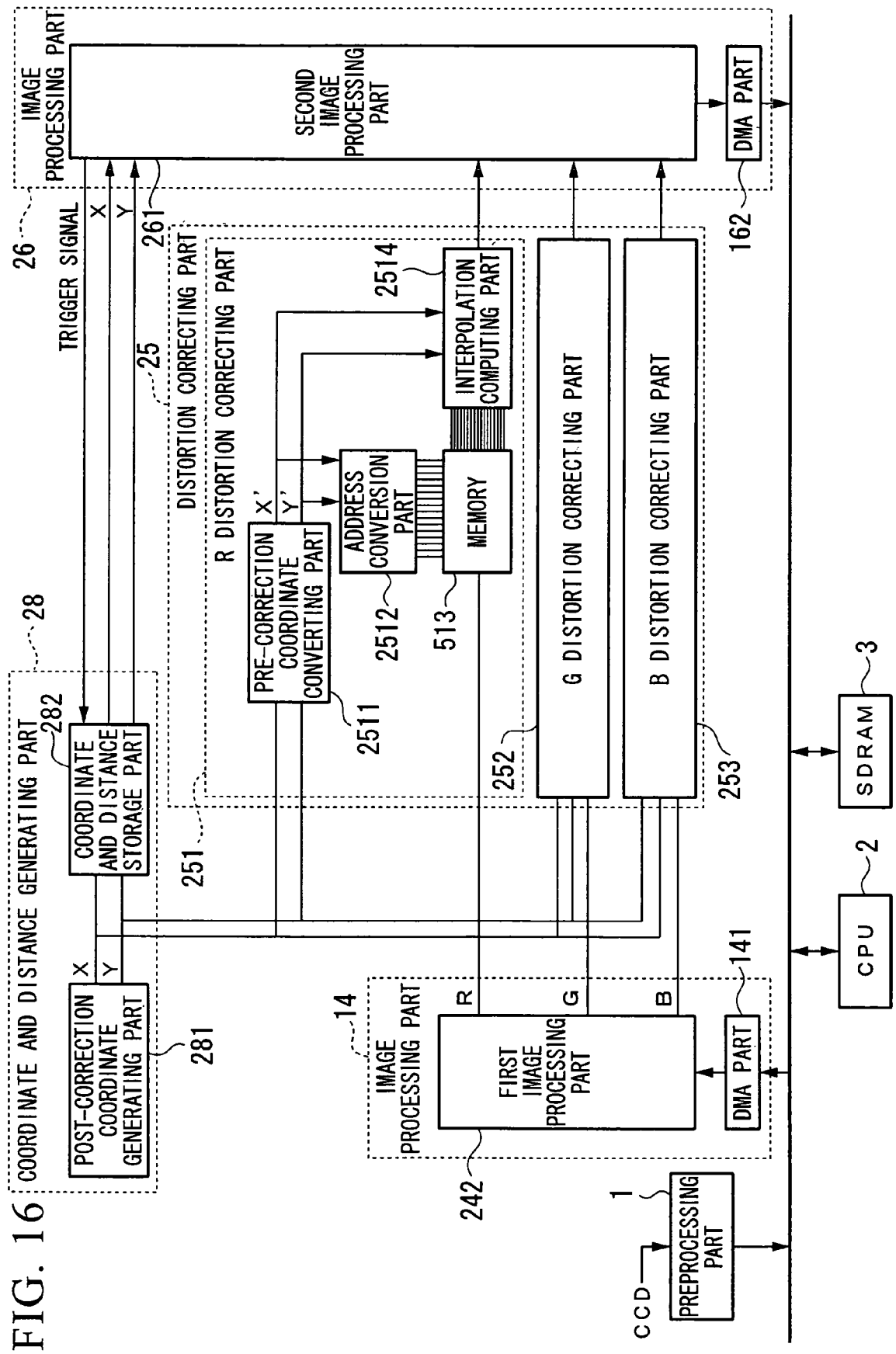
FIG. 16 is a block diagram showing the structure of an image processing apparatus of the third embodiment.

More specifically, as shown in FIG. 16, the general structure of the image processing apparatus in the present embodiment includes a preprocessing part 1, a CPU 2, an SDRAM 3, an image processing part 14, a distortion correcting part 25, an image processing part 26, and a coordinate and distance generating part 28. In FIG. 6, parts given identical reference numerals to those in the conventional example and the first embodiment have identical functions, and detailed explanations thereof are omitted.

The coordinate and distance generating part 28 consists of a post-correction coordinate generating part 281 and a coordinate and distance storage part 282. The post-correction coordinate generating part 281 generates coordinate values (X, Y) after the distortion correction, and the coordinate and distance storage part 282 stores the coordinate values (X, Y) as distance data.

The distortion correcting part 25 consists of an R distortion correcting part 251, a G distortion correcting part 252, and a B distortion correcting part 253. Each of the R, G, and B distortion correcting parts consists of a pre-correction coordinate converting part 2511, an address conversion part 2512, a memory 513, and an interpolation computing part 2514. Here, parts given identical reference numerals to those in the conventional example and the first embodiment have identical functions, and detailed explanations thereof are omitted.

The pre-correction coordinate converting part 2511 receives the coordinate values (X, Y) after the distortion correction from the post-correction coordinate generating part 281, and converts them into coordinate values (X', Y') before the distortion correction (i.e., pre-correction coordinate values (X', Y')). The converted coordinate values (X', Y') are output to the address conversion part 2512 and the interpolation computing part 2514.

Figure 17:
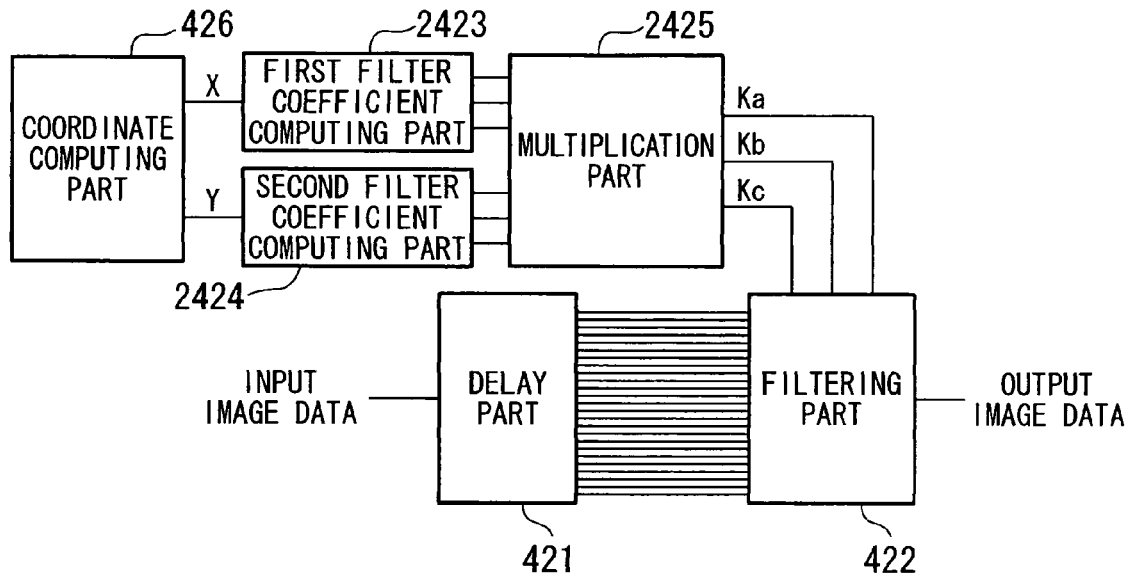
FIG. 17 is a block diagram showing the structure of an example of an LPF processing part in the image processing apparatus of the third embodiment.

As shown in FIG. 17, the circuit for performing filtering in the first image processing part 242 has a coordinate computing part 426, a first filter coefficient computing part 2423 (i.e., a filter coefficient setting part), a second filter coefficient computing part 2424 (i.e., a filter coefficient setting part), a multiplication part 2425, a delay part 421, and a filtering part 422. In FIG. 17, parts given identical reference numerals to those in the conventional example and the first embodiment have identical functions, and detailed explanations thereof are omitted.

The coordinate computing part 426 computes coordinate values (X, Y) of a target pixel, and outputs X and Y values respectively to the first filter coefficient computing part 2423 and the second filter coefficient computing part 2424. The first filter coefficient computing part 2423 and the second filter coefficient computing part 242 each compute a filter coefficient based on the received coordinate value, and output the filter coefficient to the multiplication part 2425. The multiplication part 2425 executes a specific multiplication process using the received filter coefficients, so as to compute coefficients Ka, Kb, and Kc, which are output to the filtering part 422.

Figure 18:
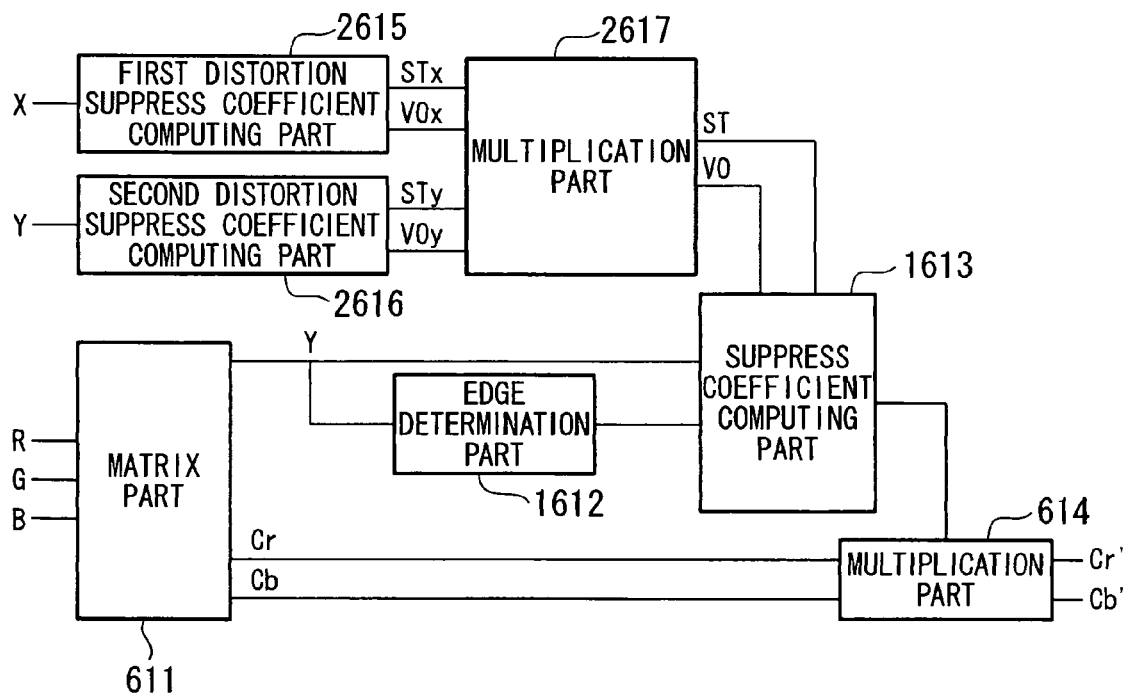
FIG. 18 is a block diagram showing the structure of an example of a chroma suppressing part in the image processing apparatus of the third embodiment.

As shown in FIG. 18, the chroma suppressing circuit in the second image processing part 261 has a matrix part 611, an edge determination part 1612, a suppress coefficient computing part 1613, a multiplication part 614, a first distortion suppress coefficient computing part 2615, a second distortion suppress coefficient computing part 2616, and a multiplication part 2617. In FIG. 18, parts given identical reference numerals to those in the conventional example and the first embodiment have identical functions, and detailed explanations thereof are omitted.

The first distortion suppress coefficient computing part 2615 and the second distortion suppress coefficient computing part 2616 receive X and Y coordinate values respectively, and compute STx and VOx with respect to X, and also STy and VOy with respect to Y. The computed coefficients STx, VOx, Sty, and VOy are output to the multiplication part 2617, which computes parameters ST and VO.

Therefore, in accordance with the present embodiment, even when the distortion optical system has a structure as shown in FIG. 15, the filtering process is appropriately controlled based on the coordinate values of the target pixel, thereby performing appropriate image processing. Similarly, with respect to the chroma suppression, the suppress coefficients are appropriately controlled based on the coordinate values of the target pixel, so that pseudo colors appearing in the vicinity of each edge can be effectively suppressed when there is a distortion aberration.

In accordance with the present invention, the filter coefficient used in the filtering part which is positioned before the distortion correcting part is set by using input data of a distance or relative coordinates measured from the position corresponding to the optical center of the optical system to a target pixel on the image data, so as to assign the filter coefficient to the position of the target pixel in accordance with the distortion aberration characteristics. Therefore, the filtering process performed in the part positioned before the distortion correcting part can be executed as if an equivalent process were applied to the image data output from the distortion correcting part.

In addition, when the filter coefficient is assigned so as to provide substantially uniform spatial frequency characteristics over the whole area with respect to the image data output from the distortion correcting part, the correction can be performed in a manner such that sharpness of the image is substantially uniform between the central part and the peripheral part of the image.

When the filter coefficient is assigned in accordance with the distance between pixels on the image data output from the distortion correcting part, influence from a pixel distant from the target pixel (for the filtering) can be reduced; thus, sharpness of the image can be substantially uniform between the central part and the peripheral part of the image.

In addition, non-uniform pseudo colors can be suppressed by setting a suppress coefficient for suppressing a pseudo color in accordance with the amount of distortion at a specific pixel in the vicinity of an edge with respect to the image data output from the distortion correcting part, and suppressing the pseudo color of the specific pixel based on the suppress coefficient.

In this case, the suppress coefficient can be set in a manner such that the larger the amount of distortion aberration, the more strongly the pseudo color is suppressed. Accordingly, it is possible to relatively strongly suppress the pseudo color at each position where the pseudo color appears strongly.

Also in this case, the suppress coefficient can be set in a manner such that the larger the amount of distortion aberration, the wider an area where the pseudo color is suppressed is determined. Accordingly, it is possible to suppress the pseudo color in the area where the pseudo color spreads widely.

In addition, based on input data of the distance or relative coordinates from the position corresponding to the optical center to the specific pixel, the distortion correcting part may compute image data in which a distortion at the specific pixel has been corrected based on the received data. In this case, a circuit for computing the distance or relative coordinates from the position corresponding to the optical center to the specific pixel can be used commonly between the distortion correcting part and the chroma suppressing part, thereby allowing simplification of the circuit structure.

On the other hand, when using a group of lenses having independent distortion aberration characteristics with respect to the directions which are perpendicular to each other, each direction can be handled independently, thereby also allowing the simplification of the circuit structure.

Therefore, in accordance with the present invention, the filtering process performed in the part positioned before the distortion correcting part can be executed as if an equivalent process were applied to the image data output from the distortion correcting part. Therefore, an image having a preferable image quality can be obtained after the pixel position correction with respect to the distortion correction. It is also possible to suppress non-uniform pseudo colors appearing after the correction of distortion aberration. In addition, common usage of a circuit with respect to simplify the whole circuit structure.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An image processing apparatus comprising:
    a distortion correcting part for correcting pixels of image data having a distortion due to distortion aberration characteristics of an optical system, and outputting corrected image data;
    a filtering part for applying a predetermined filtering process based on a filter coefficient to the image data to be input into the distortion correcting part;
    a measuring part for measuring distance data or relative coordinate data from a position corresponding to an optical center of the optical system to a target pixel for applying the filtering process on the image data, the distance data being given in a $r^2$ form where r is a distance; and
    a filter coefficient setting part for setting the filter coefficient which is used in the filtering part and is assigned to a position of the target pixel in accordance with the distortion aberration characteristics, where the filter coefficient setting part sets the filter coefficient so as to obtain substantially uniform spatial frequency characteristics for the image data after the distortion correction by the distortion correcting part based on the distance data or the relative coordinate data measured by the measuring part,
    wherein the optical system includes a group of cylindrical lenses having independent distortion aberration characteristics with respect to directions which are perpendicular to each other on a plane, wherein the distortion aberration characteristics are rotationally asymmetrical, and the plane has a normal which coincides with the optical center.

2. The image processing apparatus in accordance with claim 1, wherein the filter coefficient setting part assigns the filter coefficient so as to provide said substantially uniform spatial frequency characteristics over the whole area with respect to the image data output from the distortion correcting part.

3. The image processing apparatus in accordance with claim 1, wherein the filter coefficient setting part assigns the filter coefficient in accordance with a distance between pixels on the image data output from the distortion correcting part, which corresponds to a distance between pixels on the image data input into the distortion correcting part.

4. The image processing apparatus in accordance with claim 1, further comprising:
    a chroma suppressing part for assigning, based on input distance data or relative coordinate data measured from the position corresponding to the optical center to a specific pixel positioned in the vicinity of an edge with respect to the image data output from the distortion correcting part, a suppress coefficient for suppressing a pseudo color to the specific pixel in accordance with an amount of distortion aberration with respect to the distortion aberration characteristics, so as to suppress the pseudo color of the specific pixel based on the suppress coefficient.

5. The image processing apparatus in accordance with claim 4, wherein the chroma suppressing part assigns the suppress coefficient in a manner such that the larger the amount of distortion aberration, the more strongly the pseudo color is suppressed.

6. The image processing apparatus in accordance with claim 4, wherein the chroma suppressing part assigns the suppress coefficient in a manner such that the larger the amount of distortion aberration, the wider an area where the pseudo color is suppressed is determined.

7. The image processing apparatus in accordance with claim 4, wherein based on the distance data or the relative coordinate data from the position corresponding to the optical center to the specific pixel, the distortion correcting part computes image data in which a distortion at the specific pixel has been corrected.

8. An image processing method comprising:
   a distortion correcting step of correcting pixels of image data having a distortion due to distortion aberration characteristics of an optical system, and outputting corrected image data;
   a filtering step of applying a predetermined filtering process based on a filter coefficient before the distortion of the image data is corrected in the distortion correcting step;
   a measuring step of measuring distance data or relative coordinate data from a position corresponding to an optical center of the optical system to a target pixel for applying the filtering process on the image data, the distance data being given in a $r^2$ form where r is a distance; and
   a filter coefficient setting step of setting the filter coefficient which is used in the filtering step and is assigned to a position of the target pixel in accordance with the distortion aberration characteristics, where the filter coefficient is set so as to obtain substantially uniform spatial frequency characteristics for the image data after the distortion correction in the distortion correcting step based on the distance data or the relative coordinate data measured in the measuring step,
   wherein the optical system includes a group of cylindrical lenses having independent distortion aberration characteristics with respect to directions which are perpendicular to each other on a plane, wherein the distortion aberration characteristics are rotationally asymmetrical, and the plane has a normal which coincides with the optical center.

9. The image processing method in accordance with claim 8, wherein in the filter coefficient setting step, the filter coefficient is assigned so as to provide said substantially uniform spatial frequency characteristics over the whole area with respect to the image data output in the distortion correcting step.

10. The image processing method in accordance with claim 8, wherein in the filter coefficient setting step, the filter coefficient is assigned in accordance with a distance between pixels on the image data output in the distortion correcting step, which corresponds to a distance between pixels on the image data input in the distortion correcting step.

11. The image processing method in accordance with claim 8, further comprising:
   a chroma suppressing step of assigning, based on input distance data or relative coordinate data measured from the position corresponding to the optical center to a specific pixel positioned in the vicinity of an edge with respect to the image data output in the distortion correcting step, a suppress coefficient for suppressing a pseudo color to the specific pixel in accordance with an amount of distortion aberration with respect to the distortion aberration characteristics, so as to suppress the pseudo color of the specific pixel base on the suppress coefficient.

12. The image processing method in accordance with claim 11, wherein in the chroma suppressing step, the suppress coefficient is assigned in a manner such that the larger the amount of distortion aberration, the more strongly the pseudo color is suppressed.

13. The image processing method in accordance with claim 11, wherein in the chroma suppressing step, the suppress coefficient is assigned in a manner such that the larger the amount of distortion aberration, the wider an area where the pseudo color is suppressed is determined.

14. The image processing method in accordance with claim 11, wherein the distortion correcting step includes computing image data in which a distortion at the specific pixel has been corrected based on the distance data or the relative coordinate data from the position corresponding to the optical center to the specific pixel.

* * * * *